United States Patent [19]
Lee

[11] 3,881,472
[45] May 6, 1975

[54] SPLINT FOR THE LEG OF A DOG OR CAT
[75] Inventor: George Timothy Lee, Anderson, Ind.
[73] Assignee: Edgewood Surgical Company, Inc., Anderson, Ind.
[22] Filed: Feb. 22, 1974
[21] Appl. No.: 444,943

[52] U.S. Cl. ............................... 128/89 R; 119/96
[51] Int. Cl. .............................................. A61f 5/04
[58] Field of Search ......... 128/89, 87, 83, 165, 132, 128/133, 154; 119/126, 127, 96

[56] References Cited
UNITED STATES PATENTS

| | | | |
|---|---|---|---|
| 667,768 | 2/1901 | De Puy | 128/89 R |
| 676,243 | 6/1901 | Rommel et al. | 119/127 |
| 1,624,861 | 4/1927 | Dewey | 119/127 |
| 2,474,634 | 6/1949 | Mason | 128/89 R |

Primary Examiner—Richard A. Gaudet
Assistant Examiner—J. Yasko
Attorney, Agent, or Firm—Pollock, Philpitt & Vande Sande

[57] ABSTRACT

A splint for the leg of a dog or a cat. The splint is formed of an integral plastic member which is generally semicylindrical in cross section and lined along its interior surface with a soft, resilient material such as foam rubber or the like. The area of the splint which receives the paw is ventrally turned so as to place the carpal or wrist joint in a normal resting position. In addition, the splint provides a recess in the location of the carpal pad on the animal's leg, with such recess being configured so as to receive the carpal pad and thus prevent pressure necrosis.

2 Claims, 7 Drawing Figures

PATENTED MAY 6 1975          3,881,472
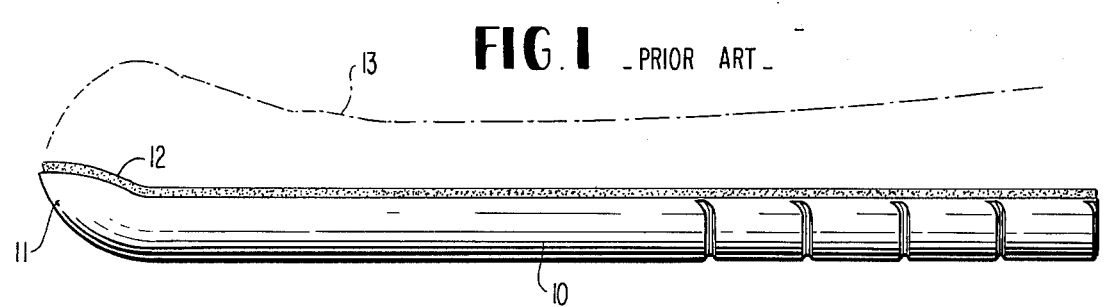
FIG. 1 _PRIOR ART_
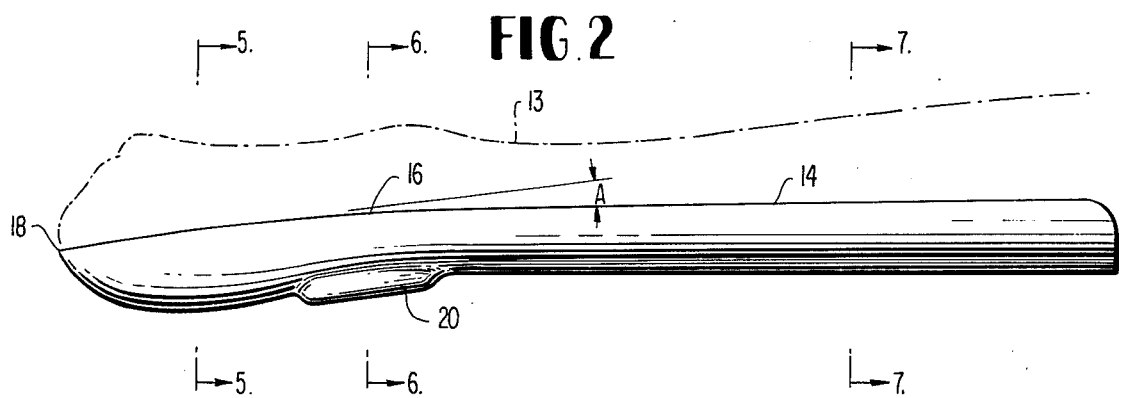
FIG. 2
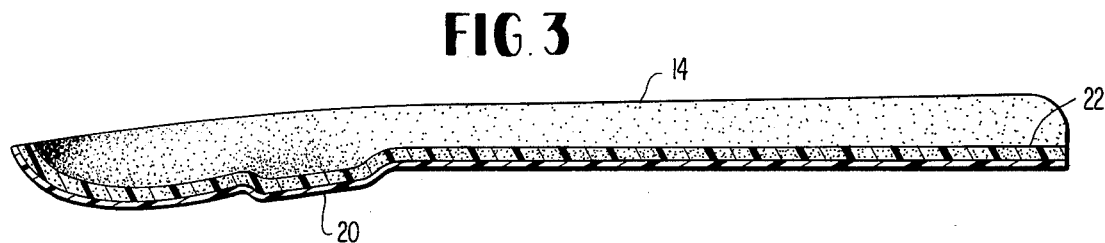
FIG. 3
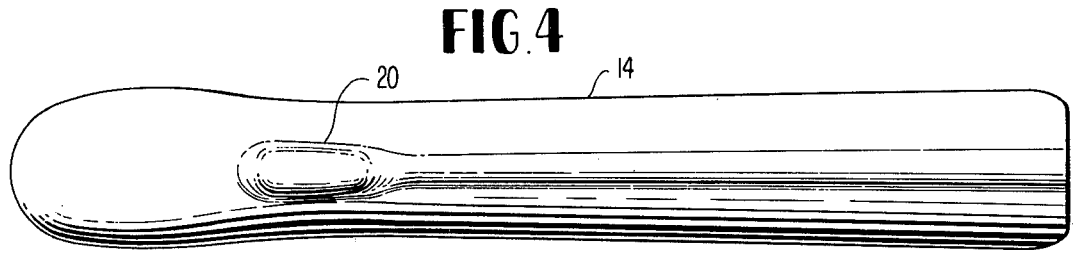
FIG. 4
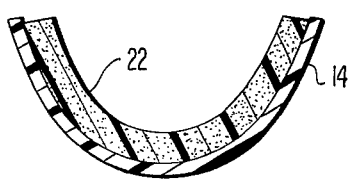
FIG. 5
FIG. 6
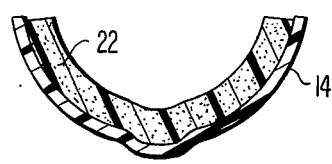
FIG. 7

SPLINT FOR THE LEG OF A DOG OR CAT

BACKGROUND OF THE INVENTION

It is known in the art to provide a splint for the leg of a small animal such as a dog or cat. The splint, of course, is used to protect the leg below the elbow following injuries to that area. A typical injury requiring the use of a splint comprises a deep laceration of the tissue or a fracture of a bone.

The prior art splints which are intended for use on the lower front leg of a dog or cat are all of a design which provides a straight splint portion, having an upturned end to receive the paw area. Such prior art splints are made either of aluminum or of plastic and are curved in cross section so as to describe one-third to one-half of a circle.

Such prior art splints have a distinct disadvantage however. The first of these is that the configuration of the splint is such as to force the joint into a hyperextended position. This tends to straighten the leg and forces it into a strained, abnormal position. The Mason patent U.S. Pat. No. 2,474,634, issued June 28, 1949 discloses a surgical splint for the leg of a small animal in which the portion of the leg below the carpal joint is inclined forwardly, thus placing the animal's leg in an even more strained, uncomfortable position. A further disadvantage of the prior art splints is that they do not provide a recess to receive the carpal pad that extends ventral to the leg. As a result, the carpal pad frequently undergoes pressure necrosis when the leg is forced tightly into the splint without special padding.

SUMMARY OF THE INVENTION

The splint of the present invention overcomes the above-described disadvantages of the prior art. Firstly, the splint is designed to have a configuration such that the area which accepts the paw is ventrally turned so as to place the carpal or wrist joint into a normal resting position. The second important advantage is that the splint of this invention provides a recess in the area of the carpal pad, thereby receiving the carpal pad but without lessening the support which is provided by the splint as a whole.

BRIEF DESCRIPTION OF THE DRAWINGS

In describing this invention, reference will be made to the accompanying drawing in which:

FIG. 1 illustrates a splint of the prior art;

FIG. 2 illustrates the improved splint of the present invention;

FIG. 3 illustrates in a longitudinal cross-sectional view the splint of FIG. 2;

FIG. 4 is a bottom view of the splint of FIG. 2;

FIG. 5 is a cross-sectional view of the splint of FIG. 2 taken along the section line 5—5;

FIG. 6 is a cross-sectional view of the splint of FIG. 2 taken along the section line 6—6; and FIG. 7 is a cross-sectional view of the splint of FIG. 2 taken along the section line 7—7.

DETAILED DESCRIPTION OF THE PREFERRED EMBODIMENT

A typical splint of the prior art intended for use on the lower front leg of a dog or a cat is shown in FIG. 1. It can be seen there that the prior art splint 10 is essentially straight along its length except for an upturned end 11 to accept the animal's paw. Such a splint is generally curved in cross section so as to describe one-third to one-half of a circle. Such a splint may be made of aluminum or of plastic and may be lined with a soft, resilient material 12 such as foam rubber or the like to relieve pressure. It can be seen from FIG. 1 that the leg 13 of a dog, for example, held tightly in the splint 10 forces the joint into a hyperextended position by attempting to straighten the dog's leg and thus forcing it into a strained, abnormal position.

The improved splint of the present invention as shown in FIG. 2 comprises a member 14 which may be formed of plastic or other suitable material which is also generally of circular cross section as shown in the cross-sectional views of FIGS. 5–7. A distinguishing characteristic of the splint of the present invention is, as shown in FIG. 2, the provision that the area accepting the paw is ventrally turned, as shown, from adjacent the location 16 to the end 18 of the splint which thus permits the carpal or wrist joint of the dog's leg to lie in a normal resting position. The angle of inclination of the end portion relative to the main body portion of the splint is represented by the reference character A, and this angle may be in the order of 10°–15°.

A further distinctive feature of the splint of the present invention is the provision for receiving the carpal pad that extends ventral to the animal's leg. Thus as shown in FIGS. 2, 3, 4, and 6, such recess 20 is positioned upwardly from the end 18 a suitable length so as to be disposed in the area where the carpal pad lies when the splint is secured to the animal's leg. This recess makes it possible for the splint to be tightly secured to the leg of the animal but without imposing any danger that pressure necrosis will result on the carpal pad. The cross-sectional view of FIG. 6 particularly illustrates this recess. It will be further noted that the splint 10 is somewhat narrower in cross section at the location of the carpal pad recess than at locations above and below such recess as can be seen by comparing FIG. 6 with FIGS. 5 and 7.

As will be apparent from FIGS. 3 and 5–7, the interior of the splint is lined with a cushioning material 22 such as foam rubber or the like which further acts to prevent any pressure necrosis anywhere along the animal's leg.

In use, a particular size of splint is selected in accordance with the width of the splint as compared with the size of the animal's paw. The length of the splint is made sufficiently long to accommodate the leg of a larger dog and the excess length may readily be removed by cutting or sawing through the splint at the end opposite that which receives the paw of the animal.

What I claim is:

1. A splint for the lower front leg of a small animal such as a dog or a cat comprising:

a rigid elongate member having a forward and rear portion which is generally part cylindrical in cross-section for securing to the ventral portion of the animal's leg, said forward portion of the member being adapted to receive the paw and carpal pad of a small animal and being inclined ventrally at an angle relative to the rear portion of the member and adapted to be positioned upwardly of the location of the carpal pad, said member defining a recess to receive the carpal pad of the leg, said member on its concave inner surface being lined with a soft, resilient material.

2. The splint of claim 1 in which the angle of inclination is about 10° – 15°.

* * * * *